(12) United States Patent
Bassemir et al.

(10) Patent No.: US 10,015,126 B2
(45) Date of Patent: *Jul. 3, 2018

(54) CROWD DETERMINED MESSAGE RESPONSE SYSTEM

(71) Applicant: International Business Machines Corporation, Armonk, NY (US)

(72) Inventors: Richard T. Bassemir, Austin, TX (US); Paul R. Bastide, Boxford, MA (US); Beth L. Hoffman, Austin, TX (US); Jennifer L. Vargus, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 170 days.

This patent is subject to a terminal disclaimer.

(21) Appl. No.: 14/695,115

(22) Filed: Apr. 24, 2015

(65) Prior Publication Data

US 2016/0127299 A1    May 5, 2016

Related U.S. Application Data

(63) Continuation of application No. 14/532,592, filed on Nov. 4, 2014.

(51) Int. Cl.
*G06F 15/16* (2006.01)
*H04L 12/58* (2006.01)

(52) U.S. Cl.
CPC ............. *H04L 51/26* (2013.01); *H04L 51/32* (2013.01)

(58) Field of Classification Search
CPC .......... H04L 12/58; H04L 51/26; H04L 51/14
USPC ......................................... 709/206, 200, 224
See application file for complete search history.

(56) References Cited

U.S. PATENT DOCUMENTS

| 7,509,381 | B1 | 3/2009 | Hutchinson et al. |
| 2007/0203991 | A1 | 8/2007 | Fisher et al. |
| 2013/0346525 | A1 | 12/2013 | Chen et al. |
| 2014/0325554 | A1* | 10/2014 | Park ................. H04N 21/25816 725/31 |

(Continued)

OTHER PUBLICATIONS

IBM, "SPSS Text Analytics for Surveys", printed on Nov. 4, 2014, 2 pages, http://www-03.ibm.com/software/products/en/spss-text-analytics-surveys.

(Continued)

*Primary Examiner* — El Hadji Sall
(74) *Attorney, Agent, or Firm* — Scully, Scott, Murphy & Presser, P.C.

(57) ABSTRACT

A crowd determined message response system may be provided. A message sent from a sender to at least one recipient over a communication network may be received. The message may be presented on a user interface device. A selection of a designated recipient for responding to the message may be received. A priority of the message sent to the designated recipient may be adjusted. The priority of the message sent to an unselected recipient of the message not selected as the designated recipient may be adjusted. The priority may be adjusted differently for the designated recipient and the unselected recipient. Based on the adjusting of the priority of the message sent to the unselected recipient, the order of importance in which the unselected recipient's messages are presented may be rearranged.

13 Claims, 10 Drawing Sheets

(56) References Cited

U.S. PATENT DOCUMENTS

2015/0039703 A1* 2/2015 Kursun .................. H04L 51/26
  709/206

OTHER PUBLICATIONS

IBM., SPSS Statistics, printed on Nov. 4, 2014, 3 pages, http://www-01.ibm.com/software/analytics/spss/products/statistics/.
Wikipedia, "Natural language processing", last modified on Oct. 26, 2014, 11 pages, http://en.wikipedia.org/wiki/Natural_language_processing.
List of IBM Patents or Patent Applications Treated as Related, dated Apr. 24, 2015, 2 pages.
U.S. Appl. No. 14/532,592, filed Nov. 4, 2014.
Office Action dated Dec. 16, 2016 received in parent U.S. Appl. No. 14/532,592, 16 pages.
Office Action dated May 17, 2017 received in parent U.S. Appl. No. 14/532,592, 12 pages.

* cited by examiner

| USER 1 ▷ | ⟲ NEW ▷ REPLY ▷ REPLY TO ALL ▷ FORWARD ▷ ▢ ▷ ☆ ▷ MARK AS ▷ 🗑 |
| --- | --- |
| qs/renovations | |
| INBOX (1) | ✉ ! WHO    SUBJECT |
| DRAFT | ✉ USER 3    RE: NEED A QUESTION ANSWERED |
| SENT | 📎 USER 2    NEED A QUESTION ANSWERED |
| FOLLOW UP | |
| ALL DOCUMENTS | |
| JUNK | |

FIG. 4E

CROWD DETERMINED MESSAGE RESPONSE SYSTEM

FIELD

The present application relates generally to computers and computer applications, and more particularly to a crowd determined message response system.

BACKGROUND

Applications (also referred to as messaging applications), which allow users to exchange messages via a network of computing devices, such as electronic mail (email) and social networks, have evolved from providing informational messages into action lists, and question and answer systems. For example, a messaging application may enable both senders and receivers to participate in a message thread. However, with the volume of messages, e.g., emails and updates, receivers may be forced to selectively process actions and questions. For instance, because of the sheer volume of messages a user has to handle, the user may only process messages from people in his network, ignoring those messages that are outside of his network. In doing so, the user may miss requests for his domain expertise, or not process them because the user sees one or more others on the distribution list of the message who may be capable of answering the message, and the user may assume that another recipient on the distribution message may handle the message. Alternatively, some senders may send a message to a large population, for instance, to increase the probability that someone will respond.

BRIEF SUMMARY

A method and system for providing a crowd determined message response system, may be provided. The method, in one aspect, may comprise receiving, by a messaging application executing on a processor, a message sent from a sender to at least one recipient over a communication network. The method may also comprise receiving, by the messaging application, from said at least one recipient a selection via an input device, of a designated recipient for responding to the message. The method may further comprise adjusting a priority of the message sent to the designated recipient. The method may also comprise adjusting the priority of the message sent to an unselected recipient of the message not selected as the designated recipient, wherein the priority is adjusted differently for the designated recipient and the unselected recipient. Based on the adjusting of the priority of the message sent to the unselected recipient, an order of importance in which the unselected recipient's messages are presented may be rearranged.

A crowd determined message response system, in one aspect may comprise a processor operable to receive a message sent from a sender to a recipient over a communication network. The processor may be further operable to receive a selection of a designated recipient for responding to the message, the selection made by the recipient. The processor may be further operable to adjust a priority of the message sent to the designated recipient. The processor may be further operable to adjust the priority of the message sent to an unselected recipient of the message not selected as the designated recipient, wherein the priority is adjusted differently for the designated recipient and the unselected recipient. Based on the adjusting of the priority of the message sent to the unselected recipient, the processor may be operable to cause rearranging of an order of importance in which the unselected recipient's messages are presented. A storage device may be operable to store the adjusted priority associated with the message for the recipient and the designated recipient.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE SEVERAL VIEWS OF THE DRAWINGS

FIGS. 4A-4E illustrate a sequence of example screenshots showing message sending and receiving with weighted and ordered list of messages according to an embodiment of the present disclosure.

DETAILED DESCRIPTION

Figure 1:
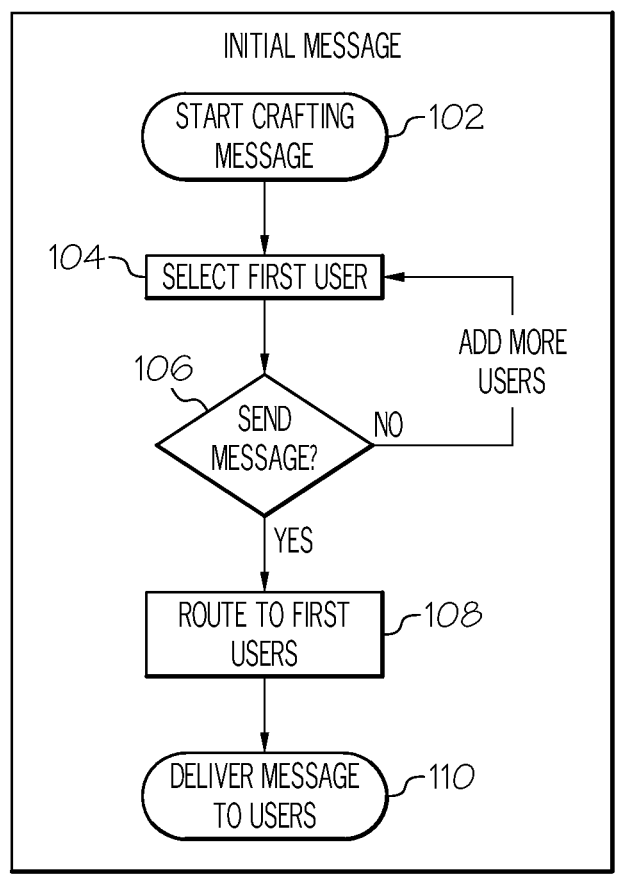
FIG. 1 is a flow diagram illustrating a method of a sender composing a message in one embodiment of the present disclosure.

The concept of crowdsourcing breaks a problem down into actionable parts, distributing the actionable parts to a high number of people, receiving the responses to the parts, and evaluating the combination of actionable parts to generate a statistically relevant result.

When a need to get the right information from the right persons arises, the act of getting the right information can be challenging, especially for engaging with people outside the trusted social network. The people with domain expertise may be willing to answer emails and requests outside their network, but they have no existing knowledge or links which highlight their need for engagement. More specifically, challenges may exist with the following: Determine who to send a message to (especially when people outside a particularly network are needed); Determine who can best respond to the message content; Get a timely answer to a message request; Recommend who is best to answer a message; A person to know when others think that the person is the best one to respond to a message (and thus a message should be a high priority for the person to answer).

Consider the following scenarios. Scenario 1: One knows a person who would know who would be the right person. For example, User A has a problem with Product H. User A knows User B manages the Development Managers for H. User A does not know what manager working for User B is the right person. User A sends User B a note asking him to answer the question. User B routes the note to User C who is the right person to answer the question.

Scenario 2: One knows it is someone. User A has a problem with Product H. User A knows the Development Managers for H should know a solution to the problem. User A sends a message to User C, User D, User E, User F, User G, and User J. User C, User D, User E, User F, User G and User J read the message and each one presumes that someone else in the distribution list will answer the message. User A waits for a response.

In one aspect of the present disclosure, a methodology may be presented that enhances the ability to generate clearer needs for messages to be answered or acted upon, for example, more clearly indicate to a recipient to reply to messages.

In one embodiment of the present disclosure, a list of messages may be presented, which more accurately reflect those that should be handled or acted upon. For instance, a method in one embodiment may retrieve a message, focusing on the list of associated users, e.g., the list of recipients of the message, e.g., as specified in the distribution list. The method may also include selecting from the list of associated users a set of users who are considered to best able to act on the message. The method may further include reweighting the presentation of the message in the list of messages for the selected user and non-selected users. For example, for the selected users, the reweighting weights the message in the positive direction (e.g., placing the message toward the top of the list); for the non-selected users, the reweighting weighs the message in negative list (e.g., placing the message toward the bottom of the list). For example, the list of messages may be an inbox, folder, list or other aggregation of messages. The method described in the present disclosure may provide for improved attention management and enhancement to collaboration portfolios.

FIG. 1 is a flow diagram illustrating a method of a sender composing a message in one embodiment of the present disclosure. At 102, a message is crafted. At 104, the sender selects a first user to send the message. At 106, if the message is to be sent, the message is routed to the specified user. At 106, if more users are to be designated as recipients, more users are added at 104. At 108, the message is routed. At 110, the message is delivered to the specified first users.

Briefly, social networking sites allow users to create an online profile for themselves, make connections and/or relationships online, and socialize with others, for example, using social media tools such as blogs, video, images, messaging, etc., to converse and share content online, for example, via computer or communication networks. An activity stream is a list of activities performed by an individual on a web site or a social web application.

Figure 2:
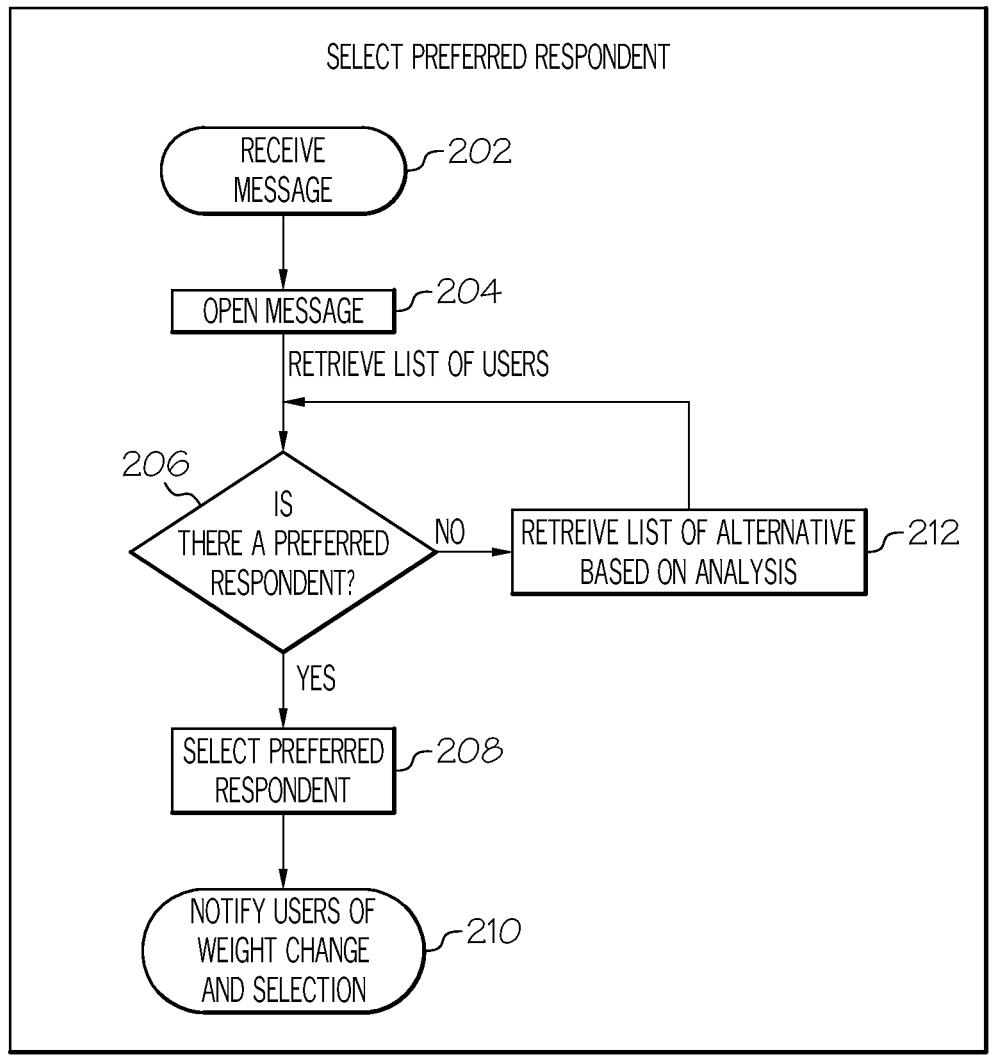
FIG. 2 is a flow diagram illustrating a method of selecting a respondent in one embodiment of the present disclosure.

FIG. 2 is a flow diagram illustrating a method of selecting a respondent in one embodiment of the present disclosure. At 202, a message is received, e.g., in a recipient's inbox or online social network activity stream, and/or another message container. At 204, the message is opened. For example, responsive to a user selecting a message appearing in an inbox, the message's content may be opened, for example, including its header information such as the list of recipients, the sender, date and time, and/or other information. At 206, a user may decide that there is at least one preferred respondent. For instance, the user knows a person who would be best able to respond to the message. The user may select that person from the list of persons. The list of persons may be those listed as recipients in the message. In another embodiment, the list may include other persons, initially not on the list of recipients of the message. For instance, if at 206, there is no preferred respondent in the list of recipients, another list may be retrieved (e.g., based on user's directive or command) at 212, from which a preferred person may be selected.

At 208, a preferred respondent is selected, for example, based on the user selecting the preferred respondent. At 210, the recipients of the message may be notified of weight change, e.g., change in weight associated with the message as pertains to each recipient. The recipients may be also notified of the selected preferred respondent.

Figure 3:
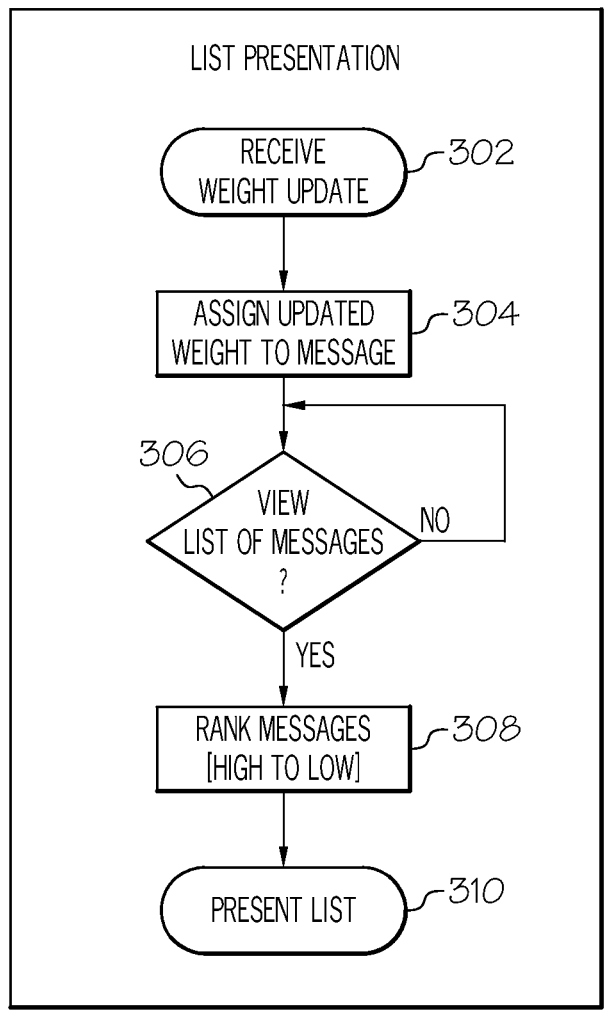
FIG. 3 is a flow diagram illustrating a method of presenting a list of messages to a recipient in one embodiment of the present disclosure.

FIG. 3 is a flow diagram illustrating a method of presenting a list of messages to a recipient in one embodiment of the present disclosure. The method, for example, includes rearranging the order of messages displayed to a recipient based on a weighting algorithm that combines crowd sourced selections (e.g., by other users of the message or other recipients of the message). In one aspect, priority and ordering of the same message may be different for different recipients. Thus, for example, the priority changes the order of messages displayed to each recipient.

At 302, an updated weight associated with a message is received, for example, by a messaging application. At 304, the messaging application may assign the updated weight to the message. At 308, for example, responsive to detecting a user selecting to view a list of messages at 306, the messaging application may rank the list of messages according to the received weight. At 310, the messaging application may present the list of messages, for example, on a recipient's inbox or the like.

Each user, for example, has an inbox or like, which may have a list of messages. The messages may be weighted or assigned weights as follows. Each message may be assigned a default weight. For example, a value of zero may be assigned as a default, indicating normal importance. Higher importance value may be indicated with a positive value, e.g., 1, 2, 3, 4, 5. Lower importance value may be indicated with a negative value, e.g., −1, −2, −3, −4, −5. Other weighting schemes may be used, e.g., 0 to 100, or others. In one embodiment, each weight is stored in an associative index where the message identifiers and associated numeric weights are stored for fast lookup. The index can be stored on the client and/or server. Storing the index on the server may enable making dynamic changes to the weights, such as User 1's vote of User 2 effects User 2's message weights in real time. The index may be updated by multiple users at the same time, for example, by multiple instances of messaging application, each instance used by a user.

In one embodiment of the present disclosure, such associative index may be stored for each user of the messaging application, for instance, the users who belong to the same email server. The messaging application may allow users to have control of turning the weighing feature (and/or the voting feature) on and off. The same message, for instance, can have different weights assigned to it based on in whose inbox the message appears.

The following describes one example method of assigning importance or weights to messages. However, it should be understood that other methods may be used to assign importance or weights. A default value may be assigned to a message. An example of a default value is zero. For instance, each incoming message may be given an additional piece of metadata, e.g., multi-purpose internet mail extension (mime) data, which indicates its weight, e.g., initially with a default value, or additional lookup index may be provided for each user that maps a message identifier with a weight value, e.g., zero as default. The format of the index may be [message_id:

weight value]. Responsive to a recipient being selected to respond to the message, that selected (or designated) recipient's message is given more weight, and the same message is given less weight to other recipients (unselected recipients).

Consider for example, a message sent to five users (e.g., recipients). The message has a default value of 0 to all five users initially. User 1 sees the message and selects User 2 to be the best person to respond to the message. In this example scenario, User 2's message weight is increased, e.g., by 1, while other users message weights are decreased, e.g., by 1. Thus, e.g., User 1's weight is −1, User 2's weight is 1, User 3's weight is −1, User 4's weight is −1, and User 5's weight is −1. Consider in the same scenario, that User 3 also selects User 2 to be the person to respond to the message. User 2's message weight is again increased, e.g., by 1. User 2's message weight becomes 1+1=2. The rest of the users' message weights are again decreased, e.g., by 1, so now their message weights are −1−1=−2.

Consider that in the same scenario, User 4 selects User 5 as the likely best person to respond to the message. In this case, User 5's message weight is increased, e.g., by 1; so User 5's message weight becomes −2+1=−1. The other users' message weights are decreased by 1: User 1's weight becomes −2−1=−3; User 2's weight becomes 2−1=1; User 3's weight becomes −2−1=−3; User 4's weight becomes −2−1=−3. Thus in this example, User 5 sees the message with higher importance (−1) than User 1, User 3 and User 4 (−3), but not User 2 (1). User's 2's inbox lists this message at the top of the User 2's messages, e.g., so that User 2 may act on the message.

A user or recipient may vote or select herself or himself as the most appropriate person to respond to the message. As described above, for example, more importance would be attributed to the message as received by the recipient while less importance would be attributed to the message as received by other recipients. For example, the weight of the message for the recipient is increased while the weight of the message for other unselected recipients is decreased.

The notification of reweighting may be an overt or covert notification, which contains all or part of the original message. The notifications may be generated from multiple people who have selected a preferred respondent. For example, if User 1 and User 2 had voted User 3, User 3's message would go up in weight, and User 3 may receive a message from both User 1 and User 2 informing User 3 that User 3 has been selected.

The weights may be normalized based on responses or weights over total number of those with the message. Such normalized weights may be used in listing different messages in order in a user's inbox. For example, a vote or designation from one user (e.g., a recipient) in a message that includes three recipients may have higher weight or importance than a vote or designation from one user (e.g., a recipient) in a message that includes fifty recipients.

The user may select more than one person, indicating an order of preference, e.g., first choice respondent, second choice respondent, etc. The preferred respondents chosen by the user do not have equal weights in one embodiment. The reweighted view may be a visual marker such as highlighting, badges, or rank based on the weight.

Figure 4A:
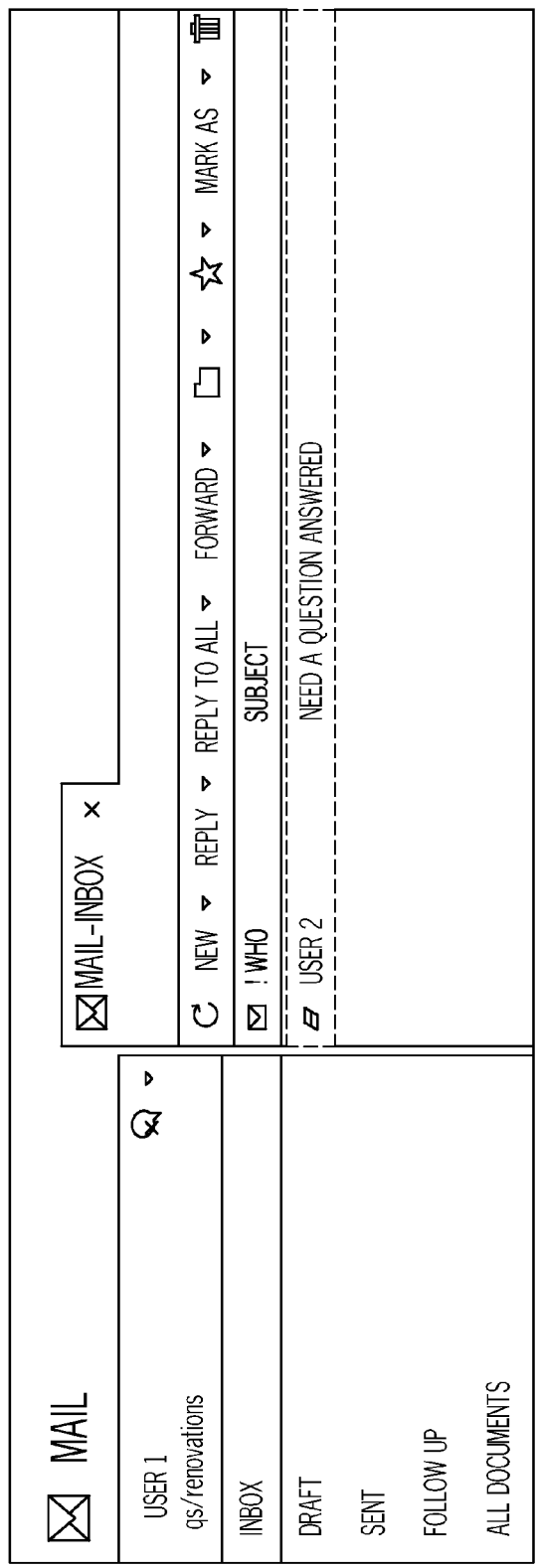
Figure 4B:
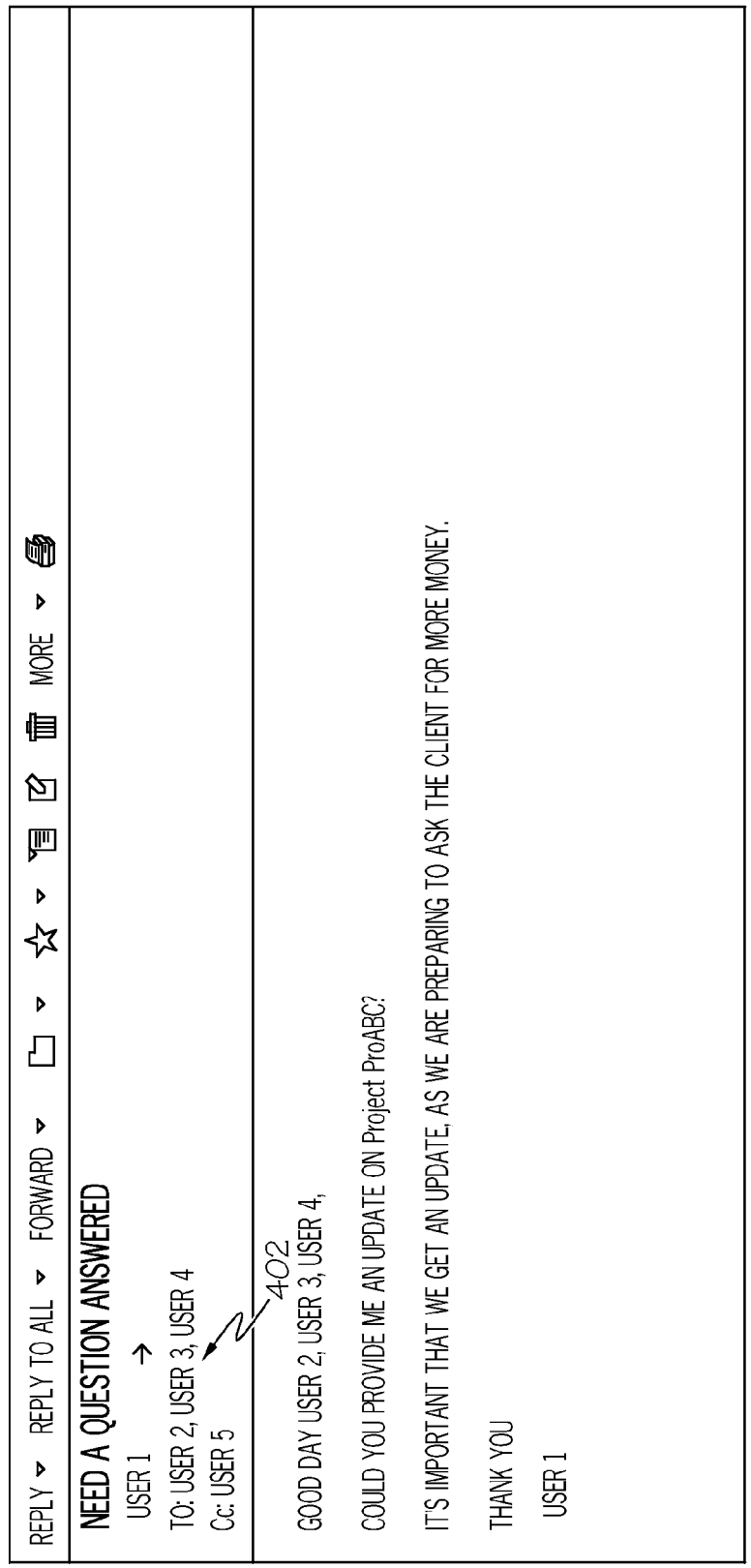
Figure 4C:
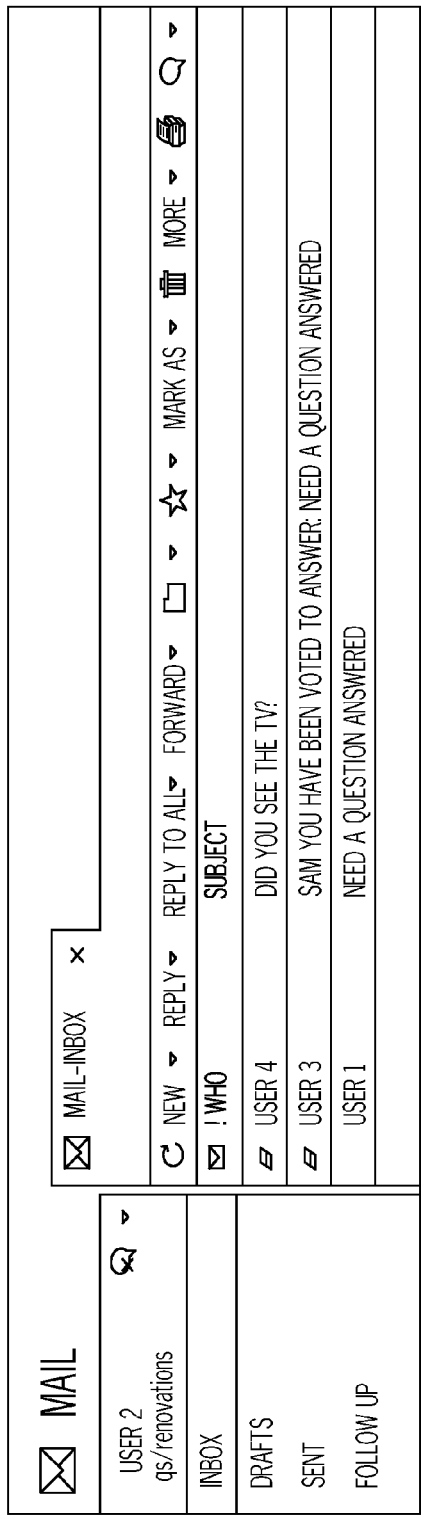

FIGS. 4A-4E illustrate a sequence of example screenshots showing message sending and receiving with weighted and ordered list of messages according to an embodiment of the present disclosure. While the screenshots are of an email inbox, it should be understood that the methodologies of the present disclosure apply to other messaging applications, for example, which present a list of messages to a user. FIG. 4A shows a user's (e.g., shown as User 1) inbox. For example, User 1 sends an email to User 2, User 3 and User 4, carbon copies User 5, and stores the send email. User 1 may not know who is best to address his email. FIG. 4B shows the content of the email sent by User 1 and received, e.g., by one of the recipients, User 2. FIG. 4B shows example recipients in 'To:' header, User 2, User 3, User 4, and in 'Cc:' header, User 5. For example, User 2, one of the recipients may receive the email, opens and reads it. User 2 may consider another recipient, for example, User 3, to be the best one to respond to this message, e.g., to address the questions or items posed in the message. Thus, User 2 may select User 3, for example, by clicking an element that represents User 3 (e.g., 402) on a user interface with an input device. Responsive to User 2 (a recipient) selecting User 3 (another recipient), User 2's inbox or like application may reweigh this message in User 2's inbox as one of the least important message (e.g., since User 2 is not one of the best persons to address the message). This is shown in FIG. 4C, in which the message from User 1 appears on the bottom of the message list.

A message may be also sent to User 3 that lets him know that he has been voted to respond to the message.

Figure 4D:
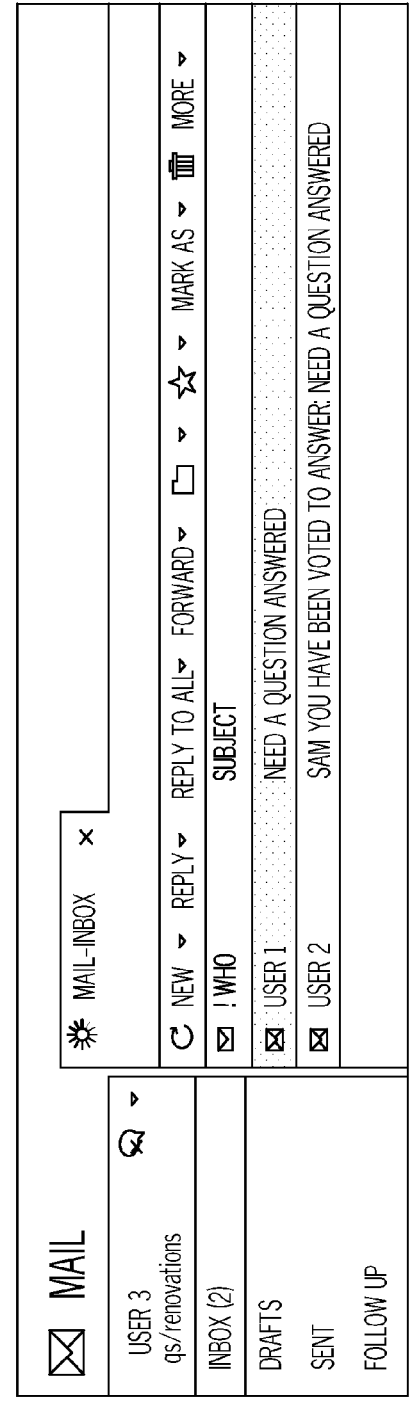

FIG. 4D shows an email application display of User 3, a recipient who has been voted to be the best person to respond to the message from User 1. The email application that displays User 3's inbox, for example, has received an updated weight associated with this message as pertains to User 3. For example, responsive to User 3 refreshing his inbox, the email application may rearrange or reprioritize a list of User 3's messages based on this updated weight, for instance, as described with reference to FIG. 3. For example, User 1's message appears at the top of the message list in User 3's inbox. User 2's message that User 3 has been voted to answer User 1's message also appears in User 3's inbox. FIG. 4E shows an email application display of User 1, in which User 3's message that responds to User 1's message is shown.

Figure 5:
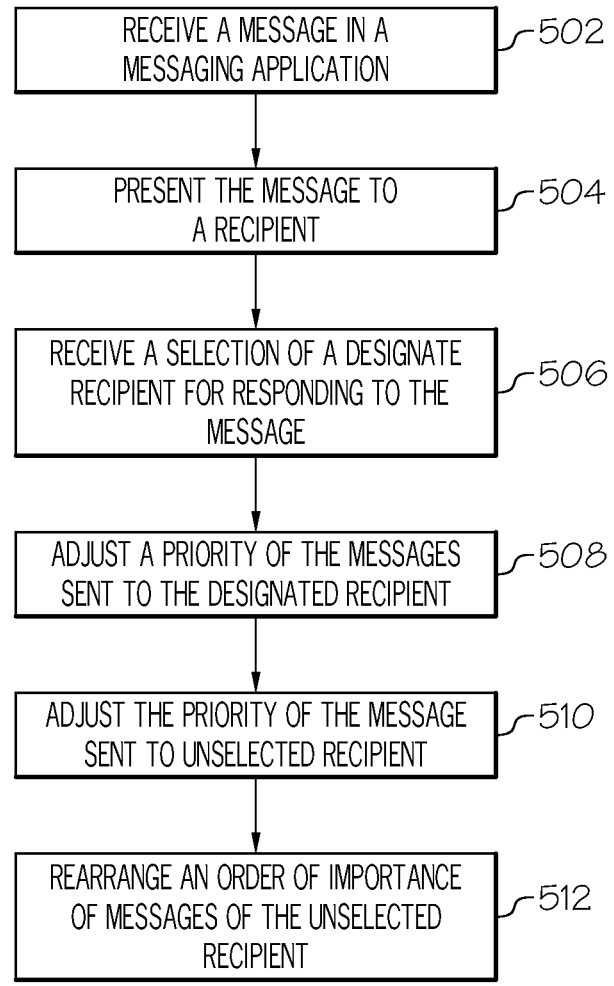
FIG. 5 is a flow diagram illustrating a method of providing a crowd determined message response system in one embodiment of the present disclosure.

FIG. 5 is a flow diagram illustrating a method of providing a crowd determined message response system in one embodiment of the present disclosure. At 502, a message is received, for example, in a messaging application or like service. Examples of such messaging applications may include, but are not limited to, a mail service (e.g., email application), social networking application or another social media application, a short message service (SMS), an instance message (IM) service. Such messaging application or service may execute or run on a hardware processor. The message may be sent and received over a communication network, for example, comprising a plurality of computer processors and network devices. A message may be sent from a sender to at least one recipient.

At 504, the message may be presented to a user or a recipient, for example, on a user interface device, e.g., a display screen or another presentation device.

At 506, a selection of a designated recipient for responding to the message may be received, for example, from the recipient of the message. For instance, as described above, a recipient of the message may know a person that is best able to respond to the message and may select that person as the designated recipient, for example, using an input device such as a mouse or keyboard and clicking or typing on an element displayed or presented on the user interface device that represents the designated recipient. The recipient may also select the designated recipient by typing or entering an identification of the designated recipient (e.g., the designated recipient's email address, or another identification). In one embodiment, the designated recipient may be one of the recipients in the distribution list of the message. In another embodiment, the designated recipient may be the recipient that is doing the selecting, in which case the recipient may designate himself or herself.

At 508, a priority of the message sent to the designated recipient is adjusted, for example, responsive to the recipient selecting the designated recipient who should respond to the message. The priority is adjusted, for example, by updating a weight associated with the message as pertains to the designated recipient. For example, the designated recipient may have a list of messages that were received in the designated recipient's inbox or another container, and one of the messages may include this message. The weight of this message in the recipient's inbox or the like may be adjusted, e.g., so that based on the adjusted weight, the designated recipient's inbox may present the list of messages in an order, which may be rearranged from the order in which the list of messages appeared before the selecting process.

At 510, the priority of the message sent to one or more recipients not selected (referred to as unselected recipient) is adjusted, for example, by updating a weight associated with the message as pertains to the unselected recipient. The same message may have different priorities to different recipients. For example, the message sent to an unselected recipient has lower priority, while the same message sent to the designated recipient has higher priority.

At 512, based on the adjusting of the priority of the message sent to the unselected recipient, the order in which the unselected recipient's messages are presented are rearranged. For example, the message may appear at the bottom of the list of messages in the unselected recipient's inbox. As another example, the message may be hidden from the list of messages displayed in the unselected recipient's inbox. For instance, the message may be minimized or moved out of the view of the recipient.

For the designated recipient, the message may appear with higher priority than other messages in the designated recipient's inbox, for example, at the top of the list. In another embodiment, the physical appearance of the order of the messages may not change, however, the message may appear among other messages with an importance indicator such as highlighting or another cue, e.g., visual or tactile cue on a graphical user interface.

Figure 6:
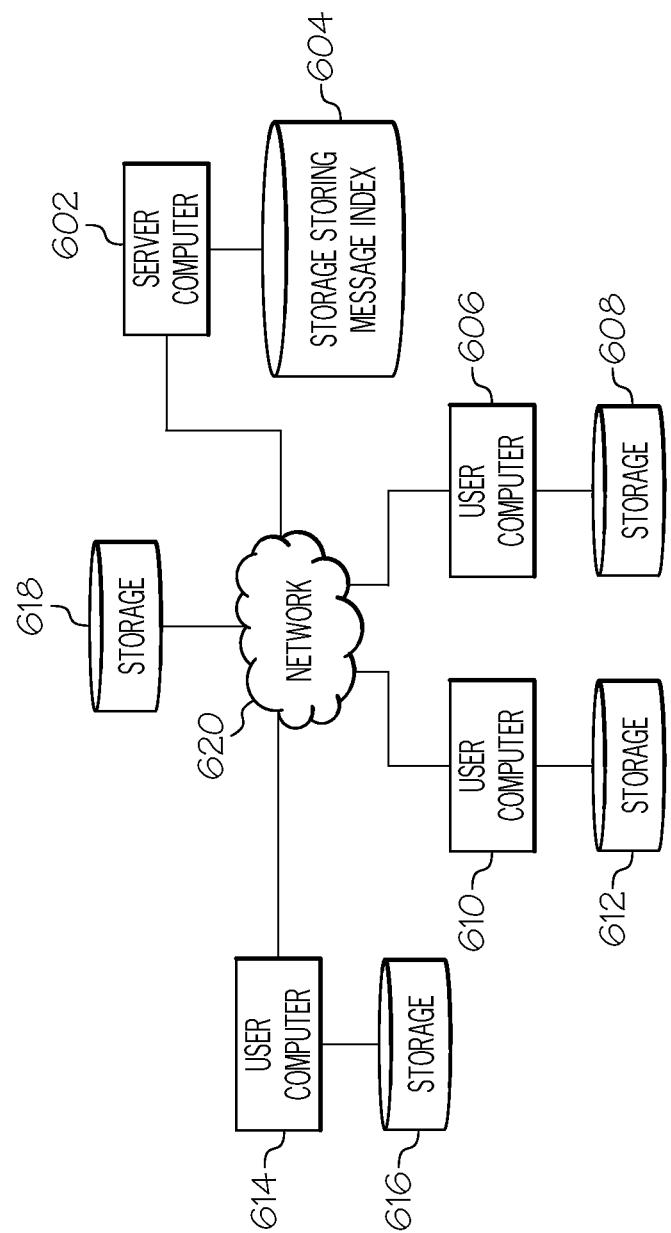
FIG. 6 is a diagram illustrating a crowd determined message response system in one embodiment of the present disclosure.

FIG. 6 is a diagram illustrating a crowd determined message response system in one embodiment of the present disclosure. One or more server computers 602, for example, may run a messaging server application, for handling sending and receiving messages to and from one or more users of the messaging application. One or more user computers 606, 610, 614, may have a messaging client application deployed therein. One or more users via one or more user computers 606, 610, 614 may use a respective messaging client application to send and receive messages from one another. The server computer 602 may store a message index (e.g., shown at 604) for each of the users, for example, centrally. Such message index may be stored on a storage device 604 that is locally connected to the server computer 602. In another aspect, the index may be stored be stored at a respective client computer, for example, a storage locally connected to a client computer, e.g., 608, 612, 616. In another aspect, the message index may be stored in a network storage device 618 to which the server computer and/or one or more user computers have access.

A user computer (e.g., 606, 610, 614) may include one or more hardware processors, memory, user interface device (e.g., a display device, an input device such as a touchpad, mouse or another), network device and other devices and interfaces. A server computer 602 may also include one or more hardware processors, memory, user interface device, network device and/or other devices and interfaces.

A processor, for example, of a server computer (e.g., 602), may receive a message sent from a sender (e.g., from a user computer 606) to one or more recipients (e.g., one or more user computers) over a communication network 620. The processor may also receive a selection of a designated recipient for responding to the message, the selection made by at least one of the recipients. For instance, as described above, the message may be presented to one or more recipients on user interface displays or devices of the user computers (e.g., 606, 610, 614). A recipient may open the message and select a recipient (referred to as a designated recipient) for responding to the message. The selected recipient or the designated recipient may be one of the recipients in the distribution list of the message. This selection may be received at the server computer 602. Based on the selection, the processor adjusts a priority of the message sent to the designated recipient. Based on the selection, the processor also adjusts the priority of the message sent to an unselected recipient of the message not selected as the designated recipient. The priority is adjusted differently for the designated recipient and the unselected recipient. Based on the adjusting of the priorities, the order of importance in which the messages are presented is rearranged. For example, the order in which the unselected recipient's messages are presented may be rearranged. Likewise, the order in which the designated recipient's messages are presented may be rearranged.

In another aspect, some of the functionalities described above may be performed at a client computer. For example, the adjusting of the priority of the message for the recipient who selects the designated recipient may be performed at the client computer of that recipient. For instance, if a recipient at user computer 606 performs the selection, the adjusting of the priority of the message in that recipient's inbox may be performed at the user computer 606 and the adjusted priority may be stored in a storage device associated with that user computer, e.g., 608.

Figure 7:
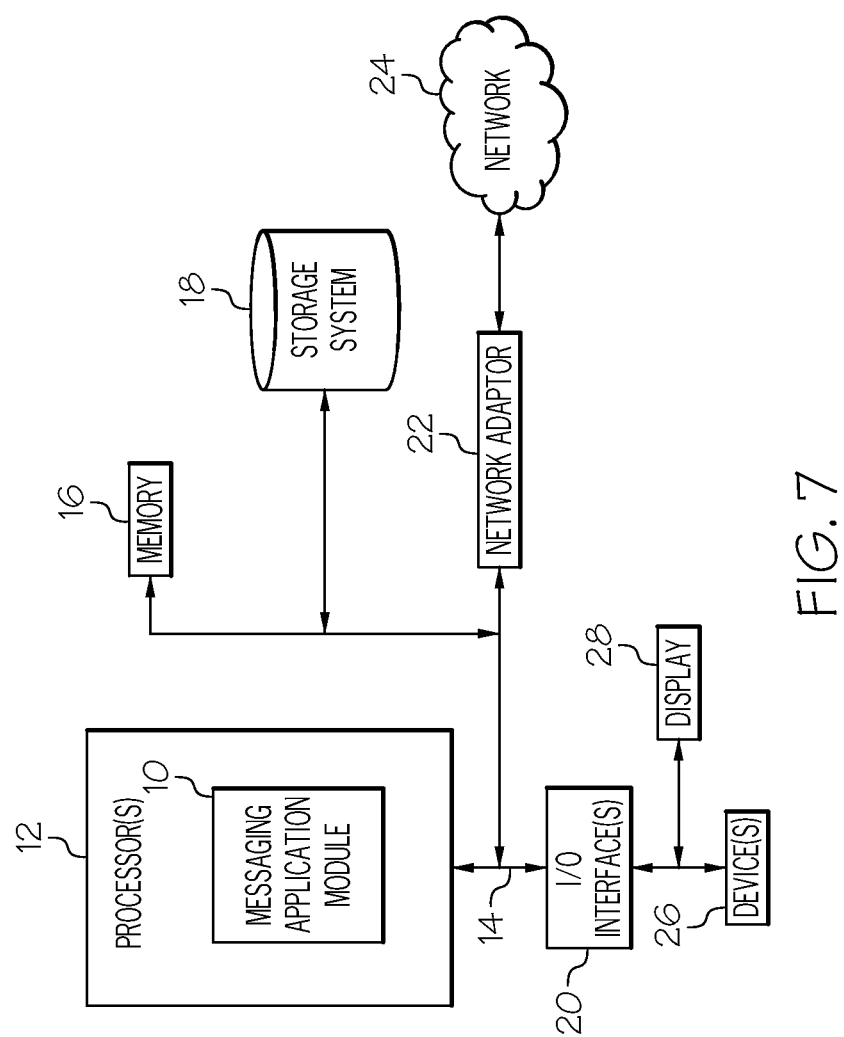
FIG. 7 illustrates a schematic of an example computer or processing system that may implement a crowd determined message response system in one embodiment of the present disclosure.

FIG. 7 illustrates a schematic of an example computer or processing system that may implement a crowd determined message response system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 7 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a messaging application module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of providing a crowd determined message response system, comprising:
   receiving, by a messaging application executing on a processor, a message sent from a sender to at least one recipient over a communication network;
   receiving, by the messaging application, from said at least one recipient a selection via an input device, of a designated recipient for responding to the message, the message addressed to a list of recipients, the recipient being one of the recipients in the list;
   adjusting a priority of the message sent to the designated recipient; and
   adjusting the priority of the message sent to an unselected recipient of the message in the list not selected as the designated recipient, wherein the priority of the message is adjusted differently for the designated recipient and the unselected recipient,
   wherein based on the adjusting of the priority of the message sent to said unselected recipient, an order of importance in which said unselected recipient's messages are presented is rearranged.

2. The method of claim 1, wherein the unselected recipient comprises said at least one recipient.

3. The method of claim 1, wherein the adjusting the priority of the message sent to the unselected recipient comprises lowering the priority of the message sent to the unselected recipient, wherein the message is presented to the unselected recipient with less priority than other messages sent to the unselected recipient.

4. The method of claim 3, wherein the message is displayed at a bottom of a message list associated with the unselected recipient.

5. The method of claim 3, wherein the message is hidden from a display of a message list associated with the unselected recipient.

6. The method of claim 1, wherein the adjusting the priority of the message sent to the designated recipient comprises giving a higher priority to the message than other messages of the designated recipient.

7. The method of claim 6, wherein the message is displayed to the designated recipient with higher priority than said other messages of said designated recipient.

8. The method of claim 1, wherein the designated recipient is included in a distribution list of the message.

9. The method of claim 1, wherein the adjusting a priority of the message sent to the designated recipient comprises updating a weight associated with the message as pertains to the designated recipient.

10. The method of claim 1, wherein the adjusting the priority of the message sent to the unselected recipient comprises updating a weight associated with the message as pertains to the unselected recipient.

11. The method of claim 1, wherein each of the designated recipient and unselected recipient's messages has associated index of weights.

12. The method of claim 1, further comprising sending a notification to the designated recipient that the designated recipient is selected to respond to the message.

13. The method of claim 1, wherein the priority of the message is adjusted differently for the designated recipient and the unselected recipient by giving a higher priority to the message than other messages in the designated recipient's inbox, while lowering the priority of the message than other messages in the unselected recipient's inbox.

\* \* \* \* \*